United States Patent
Kimura et al.

(10) Patent No.: US 8,165,192 B2
(45) Date of Patent: Apr. 24, 2012

(54) WAVEFORM EQUALIZER

(75) Inventors: Yousuke Kimura, Osaka (JP); Haruka Takano, Osaka (JP); Hiroshi Azakami, Osaka (JP)

(73) Assignee: Panasonic Corporation, Osaka (JP)

( * ) Notice: Subject to any disclaimer, the term of this patent is extended or adjusted under 35 U.S.C. 154(b) by 549 days.

(21) Appl. No.: 12/304,041

(22) PCT Filed: Oct. 19, 2007

(86) PCT No.: PCT/JP2007/070457
§ 371 (c)(1),
(2), (4) Date: Dec. 9, 2008

(87) PCT Pub. No.: WO2008/062622
PCT Pub. Date: May 29, 2008

(65) Prior Publication Data
US 2010/0013570 A1   Jan. 21, 2010

(30) Foreign Application Priority Data

Oct. 19, 2007 (WO) .................. PCT/JP2007/070457

(51) Int. Cl.
H03H 7/30 (2006.01)
H04B 1/38 (2006.01)
H03G 11/04 (2006.01)

(52) U.S. Cl. .................. 375/229; 375/222; 333/18

(58) Field of Classification Search .................. 375/229, 375/222
See application file for complete search history.

(56) References Cited

U.S. PATENT DOCUMENTS

| | | | |
|---|---|---|---|
| 5,777,910 A | 7/1998 | Lu et al. | |
| 5,901,075 A * | 5/1999 | Offord et al. | 708/322 |
| 6,351,781 B1 * | 2/2002 | Gracias et al. | 710/22 |
| 6,426,972 B1 * | 7/2002 | Endres et al. | 375/229 |
| 6,449,586 B1 * | 9/2002 | Hoshuyama | 702/190 |
| 6,611,555 B2 * | 8/2003 | Smith et al. | 375/222 |
| 6,711,205 B1 * | 3/2004 | Beaney | 375/222 |
| 7,050,491 B2 | 5/2006 | McDonald et al. | |
| 2001/0011213 A1 * | 8/2001 | Hindie et al. | 703/22 |
| 2002/0097794 A1 * | 7/2002 | Smith et al. | 375/222 |
| 2003/0223489 A1 | 12/2003 | Smee et al. | |
| 2005/0013450 A1 * | 1/2005 | Kumazawa | 381/103 |

FOREIGN PATENT DOCUMENTS

JP   2001-267981   9/2001
WO   WO 00/59168   10/2000

* cited by examiner

Primary Examiner — David C. Payne
Assistant Examiner — Sarah Hassan
(74) Attorney, Agent, or Firm — McDermott Will & Emery LLP

(57) ABSTRACT

Tap coefficients of an FIR filter are prevented from converging to wrong values. A waveform equalizer for performing waveform equalization of an input signal and outputting a waveform equalization result as an output signal includes: an FIR filter for performing a convolution operation between the input signal and a plurality of tap coefficients; an IIR filter for performing a convolution operation between the output signal and a plurality of tap coefficients; an adding section for adding an operation result of the FIR filter and an operation result of the IIR filter and outputting an addition result as the output signal; an error detecting section for detecting an error of the output signal; and a tap coefficient updating section for updating respective tap coefficients of the FIR filter and the IIR filter based on the error. The tap coefficient updating section sets a step size for updating the tap coefficients of the FIR filter to a value smaller than a step size for updating the tap coefficients of the IIR filter during a period from start of operation of the waveform equalizer until a predetermined condition is satisfied.

5 Claims, 5 Drawing Sheets

000# WAVEFORM EQUALIZER

RELATED APPLICATIONS

This application is the US National Phase under 35 U.S.C. §371 of International Application No. PCT/JP2007/070457 filed on Oct. 19, 2007, which claims the benefit of Japanese Application No. JP 2006-315690 filed on Nov. 22, 2006, the disclosures of which Applications are incorporated by reference herein.

TECHNICAL FIELD

The invention relates to a waveform equalizer for removing multipath interference in a receiver for digital broadcasting and digital radio communication.

BACKGROUND ART

A waveform equalizer for removing multipath interference is mounted on a receiver for digital broadcasting and digital radio communication. Multipath interference is a phenomenon in which a plurality of signals transmitted through different paths reach a receiver and an interference signal (ghost) that interferes with a main signal to be received is observed. The waveform equalizer restores such an interfered main signal.

A pre-ghost and a post-ghost may be generated as an interference signal of multipath interference. A pre-ghost is a transmitted signal that reaches a receiver earlier than a main signal, while a post-ghost is a transmitted signal that reaches a receiver later than a main signal.

A waveform equalizer having an FIR (finite impulse response) filter and an IIR (infinite impulse response) filter is used to equalize a received signal that includes a pre-ghost and a post-ghost. An example of such a waveform equalizer is disclosed in Patent document 1. The waveform equalizer of Patent document 1 implements reduction in power consumption and circuit area by varying convolution operation accuracy according to a calculated operation accuracy control value.

Patent document 1: Japanese Laid-Open Patent Publication No. 2005-39687

DISCLOSURE OF THE INVENTION

Problems to be Solved by the Invention

However, such a waveform equalizer may cause wrong convergence of FIR tap coefficients due to a ghost included in an input signal. In other words, wrong convergence of tap coefficients of an FIR filter may occur due to a post-ghost that is suppressed by an IIR Filter, causing degradation in waveform equalizing capability.

It is an object of the invention to prevent tap coefficients of an FIR filter from converging to wrong values in a waveform equalizer having an FIR filter and an IIR filter.

Means for Solving the Problems

According to the invention, a waveform equalizer for performing waveform equalization of an input signal and outputting a waveform equalization result as an output signal includes: an FIR (finite impulse response) filter for performing a convolution operation between the input signal and a plurality of tap coefficients; an IIR (infinite impulse response) filter for performing a convolution operation between the output signal and a plurality of tap coefficients; an adding section for adding an operation result of the FIR filter and an operation result of the IIR filter and outputting an addition result as the output signal; an error detecting section for detecting an error of the output signal and outputting the detected error; and a tap coefficient updating section for updating respective tap coefficients of the FIR filter and the IIR filter based on the error. The tap coefficient updating section sets a step size for updating the tap coefficients of the FIR filter to a value smaller than a step size for updating the tap coefficients of the IIR filter during a period from start of operation of the waveform equalizer until a predetermined condition is satisfied.

As described above, the step size for updating the tap coefficients of the FIR filter is set to a value smaller than the step size for updating the tap coefficients of the IIR filter during the period from the start of operation of the waveform equalizer until the predetermined condition is satisfied. Therefore, the tap coefficients of the IIR filter can be made to converge earlier than the tap coefficients of the FIR filter, thereby preventing wrong convergence of the tap coefficients of the FIR filter due to a ghost that is suppressed by the IIR filter.

EFFECTS OF THE INVENTION

According to the invention, the step size is properly controlled in the operation of updating respective tap coefficients of the FIR filter and the IIR filter. Therefore, the tap coefficients of the FIR filter can be prevented from converging to wrong values. Since a relatively simple circuit is used, waveform equalizing capability of the waveform equalizer can be improved without significantly increasing the circuit area.

DESCRIPTION OF THE REFERENCE NUMERALS

Figure 1:
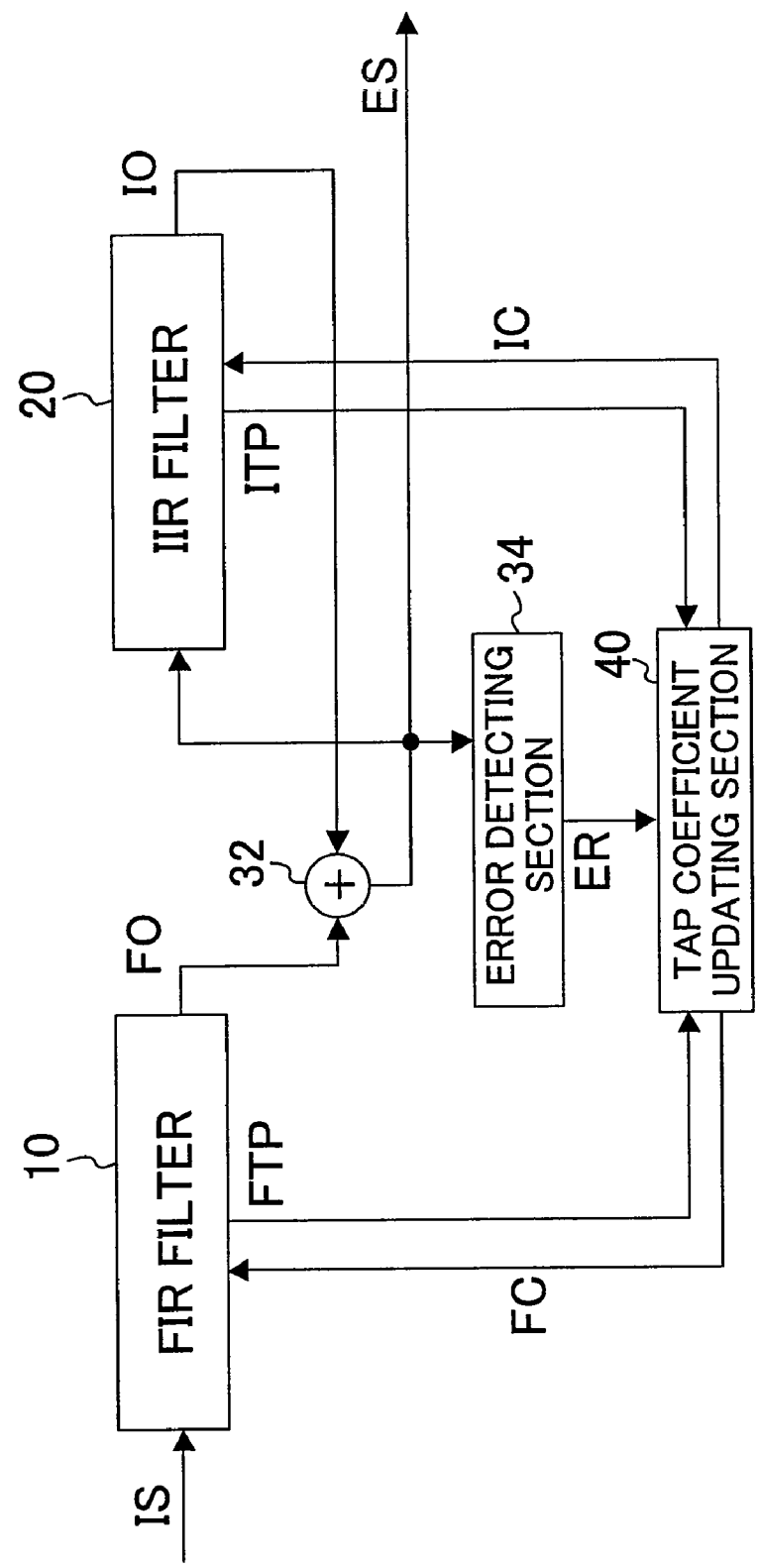
FIG. 1 is a block diagram showing a structure of a waveform equalizer according to an embodiment of the invention.

10 FIR filter
20 IIR filter
32 adder
34 error detecting section
40 tap coefficient updating section
62, 262, 362 comparator
64 counter
66 differentiator

BEST MODE FOR CARRYING OUT THE INVENTION

Hereinafter, embodiments of the invention will be described with reference to the accompanying drawings.

FIG. 1 is a block diagram showing a structure of a waveform equalizer according to an embodiment of the invention. The waveform equalizer of FIG. 1 includes an FIR filter 10, an IIR filter 20, an adder 32, an error detecting section 34, and a tap coefficient updating section 40. This waveform equalizer is used in, for example, an ATSC (Advanced Television Systems Committee) VSB (vestigial-sideband) receiver. An input signal IS including a main signal and an interference signal (ghost) is applied to the waveform equalizer of FIG. 1. This waveform equalizer restores the main signal from the input signal IS and outputs the obtained result as an output signal ES.

The FIR filter 10 delays the input signal IS to obtain a plurality of tap values each delayed by a predetermined time. The FIR filter 10 performs a convolution operation between the input signal IS and a plurality of tap coefficients respectively corresponding to the plurality of tap values and outputs the operation result to the adder 32 as a signal FO. The IIR filter 20 delays an output signal ES of the waveform equalizer of FIG. 1 to obtain a plurality of tap values each delayed by a predetermined time. The IIR filter 20 performs a convolution operation between the output signal ES and a plurality of tap coefficients respectively corresponding to the plurality of tap values and outputs the operation result to the adder 32 as a signal IO.

The adder 32 adds the signals FO and IO and outputs the result as an output signal ES. The error detecting section 34 detects an error ER between the output signal ES and a desired signal and outputs the detected error ER to the tap coefficient updating section 40. The tap coefficient updating section 40 updates the respective tap coefficients of the FIR filter 10 and the IIR filter 20 according to the error ER.

Figure 2:
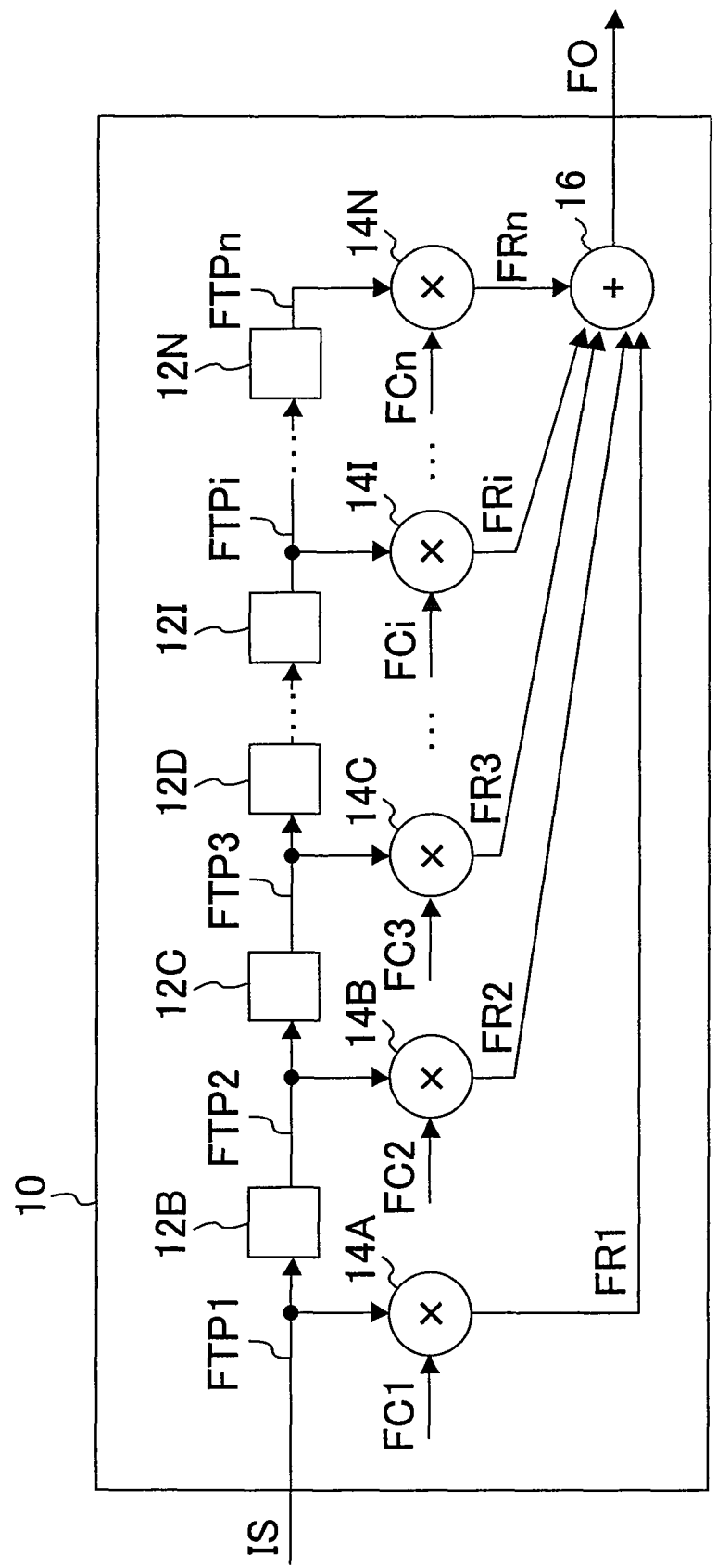
FIG. 2 is a block diagram showing an example of a structure of an FIR filter in FIG. 1.

FIG. 2 is a block diagram showing an example of a structure of the FIR filter 10 in FIG. 1. The FIR filter 10 includes (n−1) (where n is a natural number) delay devices 12B, 12C, ..., 12I, ..., 12N, n multipliers 14A, 14B, ..., 14I, ..., 14N, and an adder 16.

The delay devices 12B through 12N are serially connected to each other and an output of each delay device is connected to an input of a delay device of the subsequent stage. Each of the delay devices 12B through 12N delays an input signal by a delay $T_S$ and outputs the resultant signal. It is herein assumed that an input of the delay device 12B (an input signal IS) is a tap value FTP1 and outputs of the delay devices 12B through 12N are tap values FTP2, FTP3, ..., FTPn, respectively. Tap coefficients FC1, FC2, ..., FCn correspond to the tap values FTP1 through FTPn, respectively. The delay $T_S$ is equal to a symbol period of the input signal IS.

The multiplier 14A multiplies the tap value FTP1 by the corresponding tap coefficient FC1 and outputs the multiplication result FR1 to the adder 16. Similarly, each of the multipliers 14B through 14N multiplies a corresponding one of the tap values FTP2 through FTPn by a corresponding one of the tap coefficients FC2 through FCn and outputs a corresponding one of the multiplication results FR2 through FRn to the adder 16. The adder 16 adds all the multiplication results obtained by the multipliers 14A through 14N and outputs the result. By repeating such an operation, the FIR filter 10 performs a convolution operation between the input signal IS and the tap coefficients FC1 through FCn, and outputs the operation result to the adder 32 as a signal FO.

Figure 3:
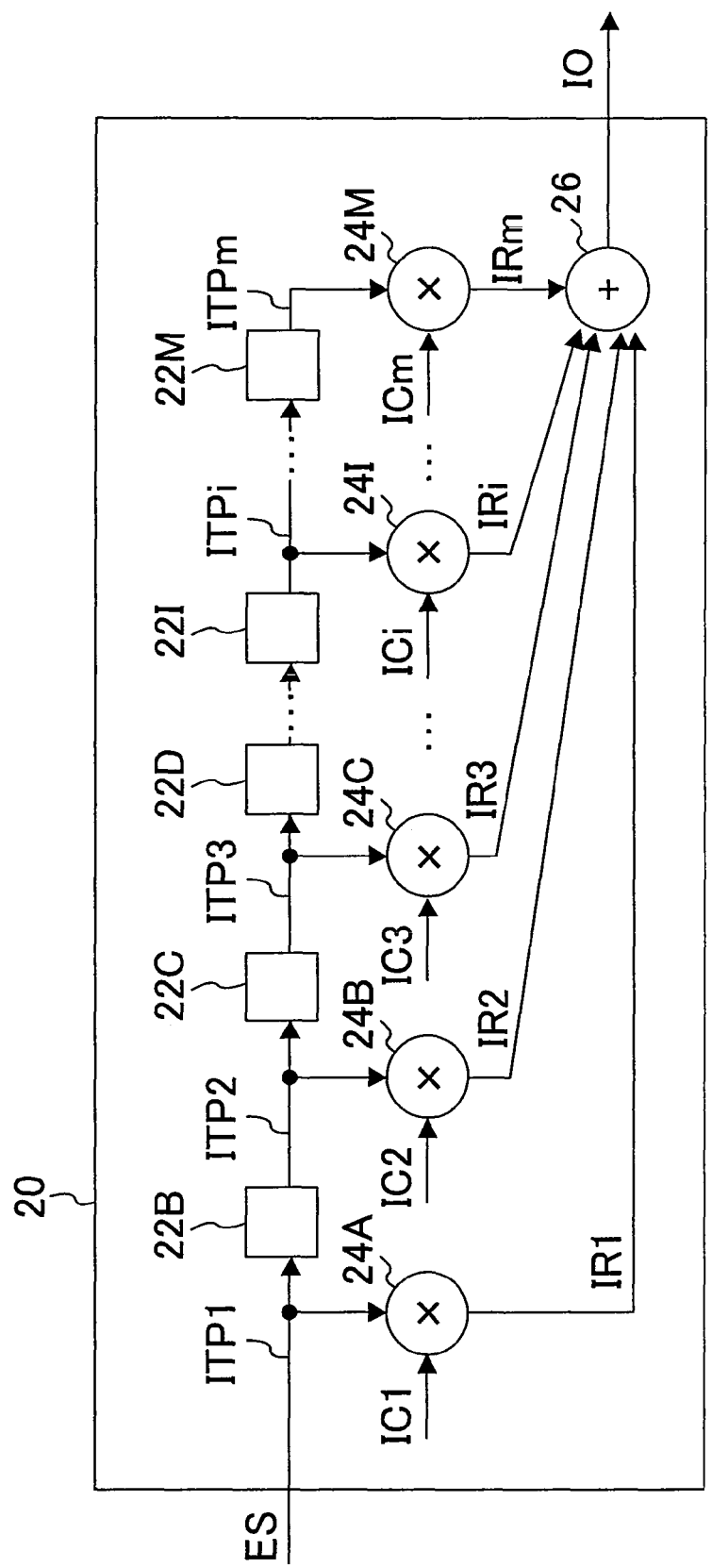
FIG. 3 is a block diagram showing an example of a structure of an IIR filter in FIG. 1.

FIG. 3 is a block diagram showing an example of a structure of the IIR filter 20 in FIG. 1. The IIR filter 20 includes (m−1) (where m is a natural number) delay devices 22B, 22C, ..., 22I, ..., 22M, m multipliers 24A, 24B, ..., 24I, ..., 24M, and an adder 26. The IIR filter 20 has approximately the same structure as that of the FIR filter 10 in FIG. 1 except the number of taps and the tap coefficients.

The delay devices 22B through 22M are serially connected to each other and an output of each delay device is connected to an input of a delay device of the subsequent stage. Each of the delay devices 22B through 22M delays an input signal by a delay $T_S$ and outputs the resultant signal. It is herein assumed that an input of the delay device 22B (an output signal ES) is a tap value ITP1 and outputs of the delay devices 22B through 22M are tap values ITP2, ITP3, ..., ITPm, respectively. Tap coefficients IC1, IC1, ..., ICm correspond to the tap values ITP1 through ITPm, respectively.

Each of the multipliers 24A through 24M multiplies a corresponding one of the tap values ITP1 through ITPm by a corresponding one of the tap coefficients IC1 through ICm and outputs a corresponding one of the multiplication results IR1 through IRm to the adder 26. The adder 26 adds all the multiplication results obtained by the multipliers 24A through 24M and outputs the result. By repeating such an operation, the IIR filter 20 performs a convolution operation between the output signal ES and the tap coefficients IC1 through ICm and outputs the result to the adder 32 as a signal IO.

In FIG. 1 and some other figures, the tap coefficients FC1 through FCn, the tap values FTP1 through FTPn, the tap coefficients IC1 through ICm, and the tap values ITP1 through ITPm are collectively referred to as FC, FTP, IC, and ITP, respectively.

Figure 4:
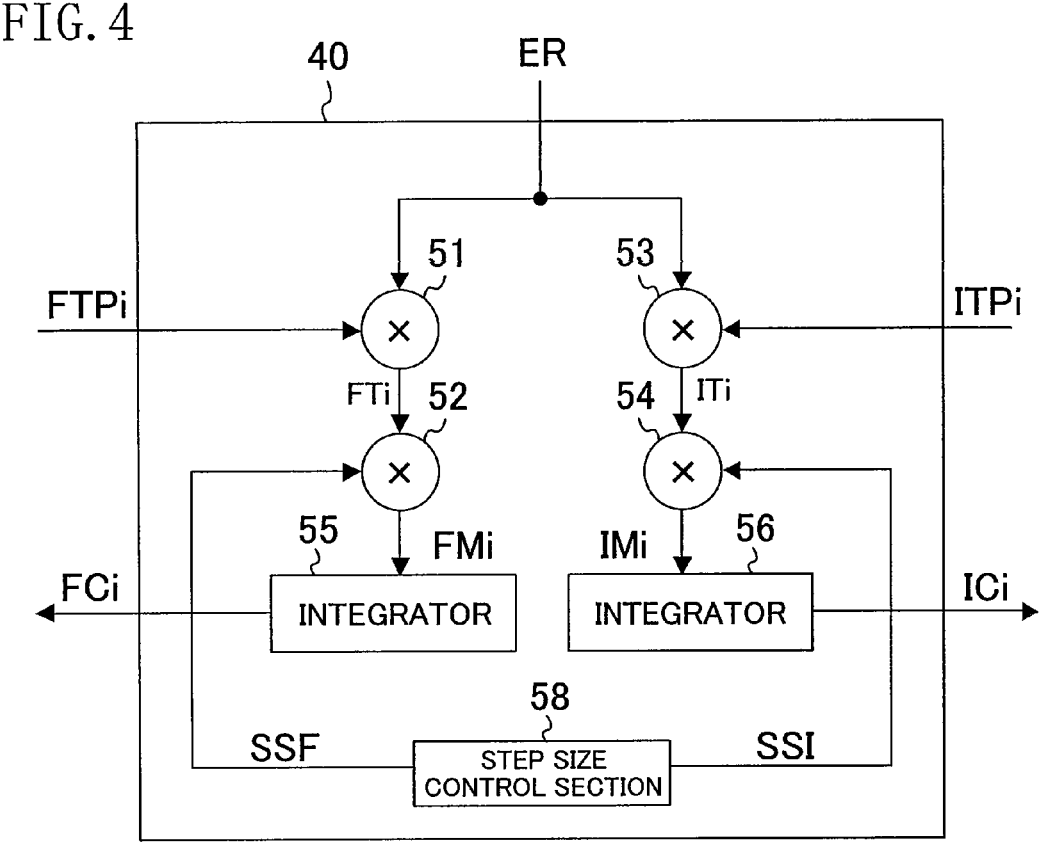
FIG. 4 is a block diagram showing an example of a structure of a tap coefficient updating section in FIG. 1.

FIG. 4 is a block diagram showing an example of a structure of the tap coefficient updating section 40 in FIG. 1. The tap coefficient updating section 40 includes multipliers 51, 52, 53, and 54, integrators 55 and 56, and a step size control section 58. For example, it is herein assumed that the tap coefficients are updated by using an LMS (Least Mean Square) algorithm.

The step size control section 58 outputs an FIR step size SSF for updating the filter coefficients of the FIR filter 10 and an IIR step size SSI for updating the filter coefficients of the IIR filter 20.

An operation of updating tap coefficients FCi and ICi will be described below as an example. The multiplier 51 multiplies an error ER and a tap value FTPi and outputs the multiplication result FTi. The multiplier 52 multiplies the multiplication result FTi and the FIR step size SSF and outputs the multiplication result FMi to the integrator 55. The integrator 55 accumulates the multiplication result FMi and outputs the result to the FIR filter 10 as a new tap coefficient FCi. The multipliers 51 and 52 and the integrator 55 perform such processing for all the tap coefficients FC1 through FCn of the FIR filter 10.

The multiplier 53 multiplies an error ER and a tap value ITPi and outputs the multiplication result ITi. The multiplier 54 multiplies the multiplication result ITi and the IIR step size SSI and outputs the multiplication result IMi to the integrator 56. The integrator 56 accumulates the multiplication result IMi and outputs the result to the IIR filter 20 as a new tap coefficient ICi. The multipliers 53 and 54 and the integrator 56 perform such processing for all the tap coefficients IC1 through ICm of the IIR filter 20.

Figure 5:
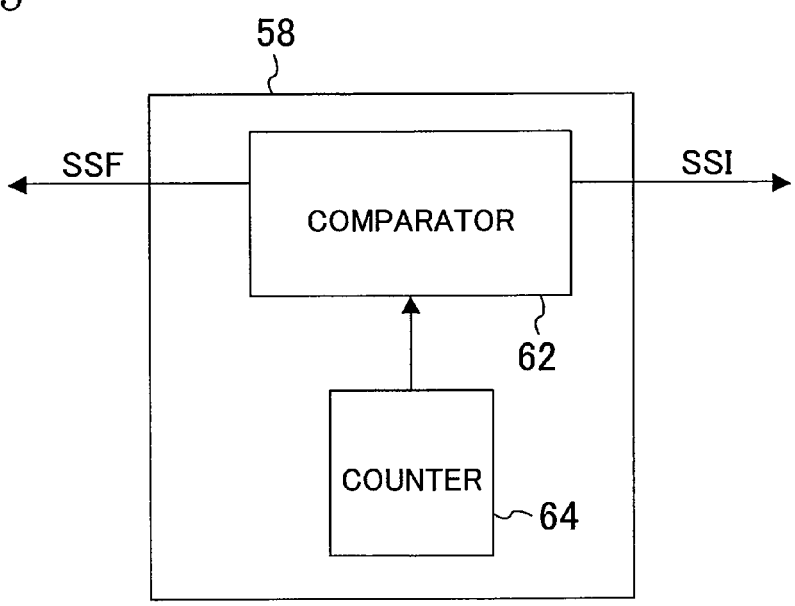
FIG. 5 is a block diagram showing an example of a structure of a step size control section in FIG. 4.

FIG. 5 is a block diagram showing an example of a structure of the step size control section 58 in FIG. 4. The step size control section 58 of FIG. 5 includes a comparator 62 and a counter 64.

The counter 64 starts a count operation when operation of the waveform equalizer of FIG. 1 is started, and measures the time elapsed since the start of the operation of the waveform equalizer. The comparator 62 outputs $1/32$ as an FIR step size SSF and ⅛ as an IIR step size SSI until the elapsed time measured by the counter 64 reaches a switch threshold value of 100 ms. The comparator 62 outputs ⅛ as an FIR step size SSF and an IIR step size SSI after the time measured by the counter 64 exceeds the switch threshold of 100 ms.

As described above, the FIR step size SSF is smaller than the IIR step size SSI until a predetermined time elapses from the start of the operation. Therefore, the tap coefficients of the IIR filter 20 can be made to converge earlier than the tap coefficients of the FIR filter 10, thereby preventing wrong convergence of the tap coefficients of the FIR filter 10 due to a ghost that is suppressed by the IIR filter 20. As a result, waveform equalizing capability of the waveform equalizer can be improved.

Figure 6:
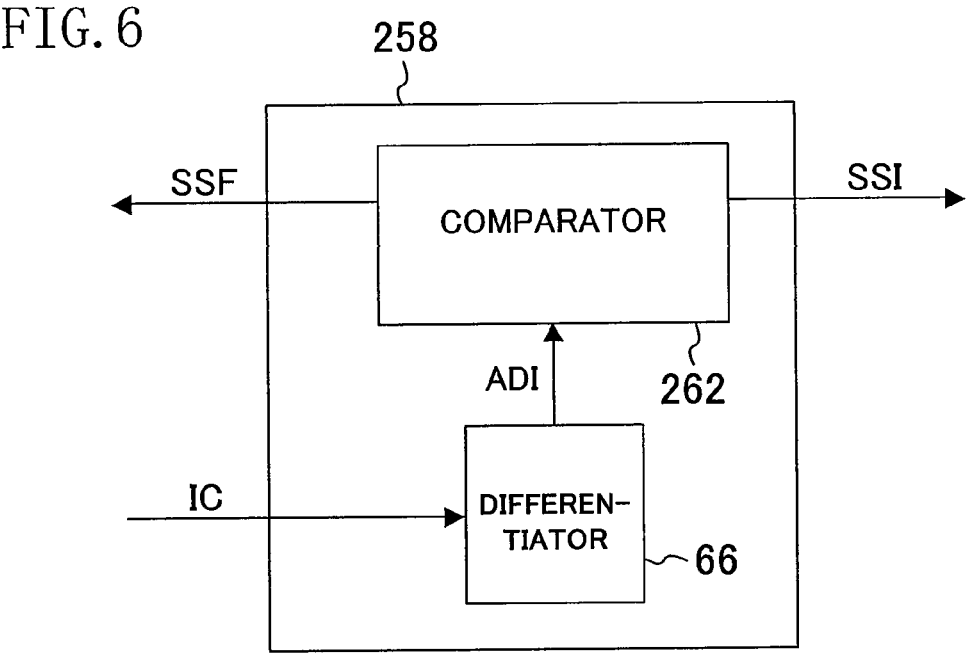
FIG. 6 is a block diagram showing a structure of a modification of the step size control section in FIG. 5.

FIG. 6 is a block diagram showing a structure of a modification of the step size control section 58 in FIG. 5. A step size control section 258 of FIG. 6 includes a comparator 262 and a differentiator 66.

The differentiator 66 receives tap coefficients IC1 through ICm from the IIR filter 20 and obtains an absolute value of a derivative value for each of the tap coefficients IC1 through ICm. The differentiator 66 then obtains a sum ADI of the respective absolute values and outputs the sum ADI to the comparator 262. The comparator 262 compares the sum ADI with a switch threshold value and outputs an FIR step size SSF according to the comparison result.

It is herein assumed that the switch threshold value is set to 0.05 in the comparator 262. When the sum ADI is equal to or larger than 0.05, the comparator 262 outputs 1/32 as an FIR step size SSF and ⅛ as an IIR step size SSI. When the sum ADI becomes smaller than 0.05, the comparator 262 outputs ⅛ as an FIR step size SSF and an IIR step size SSI.

As described above, even when the step size control section 25 of FIG. 6 is used instead of the step size control section 58 of FIG. 5, the tap coefficients of the IIR filter 20 can be made to converge earlier than the tap coefficients of the FIR filter 10, thereby preventing wrong convergence of the tap coefficients of the FIR filter 10 due to a ghost that is suppressed by the IIR filter 20. When there is no post-ghost to be suppressed by the IIR filter 20, convergence time of the tap coefficients of the FIR filter 10 can be reduced.

Figure 7:
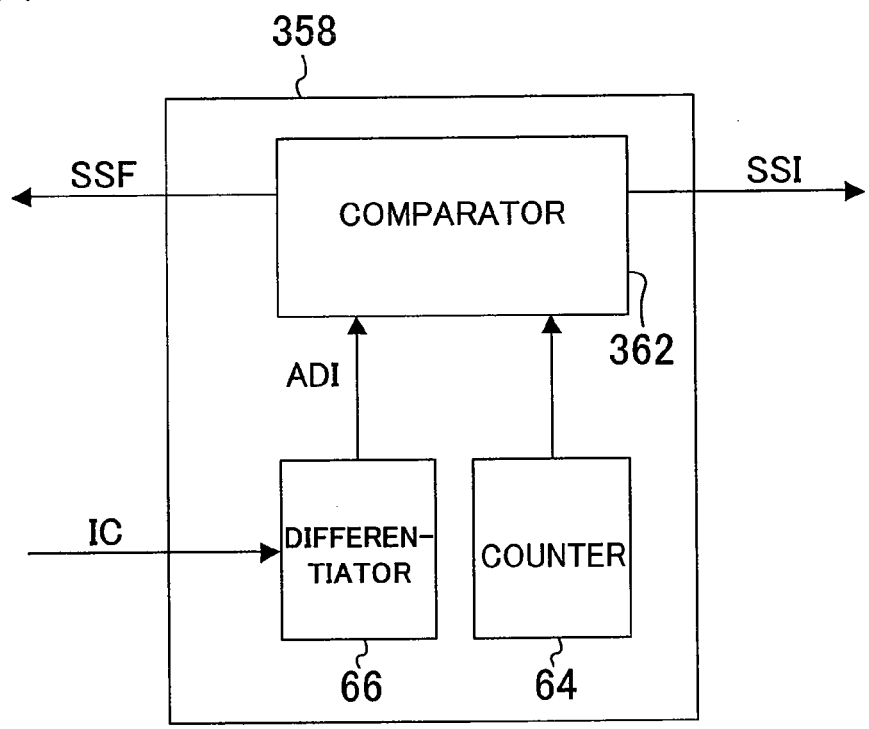
FIG. 7 is a block diagram showing a structure of another modification of the step size control section in FIG. 5.

FIG. 7 is a block diagram showing a structure of another modification of the step size control section 58 in FIG. 5. The step size control section 358 of FIG. 7 includes a comparator 362, a counter 64, and a differentiator 66.

The counter 64 and the differentiator 66 are the same as those described with reference to FIGS. 5 and 6. In other words, the counter 64 starts a count operation when operation of the waveform equalizer of FIG. 1 is started, and measures the time elapsed since the start of the operation of the waveform equalizer. The differentiator 66 receives tap coefficients IC1 through ICm from the IIR filter 20 and obtains an absolute value of a derivative value for each of the tap coefficients. The differentiator 66 then obtains a sum ADI of the respective absolute values and outputs the sum ADI to the comparator 362.

A switch threshold value is set to, for example, 100 ms in the comparator 362. The comparator 362 increases the switch threshold value when the sum ADI is equal to or larger than a predetermined value, and decreases the switch threshold value when the sum ADI is smaller than the predetermined value. The comparator 362 is otherwise the same as the comparator 62.

As described above, even when the step size control section 358 is used instead of the step size control section 58 of FIG. 5, the tap coefficients of the IIR filter 20 can be made to converge earlier than the tap coefficients of the FIR filter 10, and wrong convergence of the tap coefficients of the FIR filter 10 can be prevented.

Note that the FIR step size SSF, the IIR step size SSI, and each switch threshold value described in the above embodiments are by way of example only and may have different values from those described above. The FIR step size SSF may be zero.

Industrial Applicability

As has been described above, the invention is capable of preventing tap coefficients of an FIR filter from converging to wrong values. Therefore, the invention is useful for a waveform equalizer and the like.

The invention claimed is:

1. A waveform equalizer for performing waveform equalization of an input signal and outputting a waveform equalization result as an output signal, comprising:
   an FIR (finite impulse response) filter for performing a convolution operation between the input signal and a plurality of tap coefficients;
   an IIR (infinite impulse response) filter for performing a convolution operation between the output signal and a plurality of tap coefficients;
   an adding section for adding an operation result of the FIR filter and an operation result of the IIR filter and outputting an addition result as the output signal;
   an error detecting section for detecting an error of the output signal and outputting the detected error; and
   a tap coefficient updating section for updating respective tap coefficients of the FIR filter and the IIR filter based on the error,
   wherein the tap coefficient updating section sets a step size for updating the tap coefficients of the FIR filter to a value smaller than a step size for updating the tap coefficients of the IIR filter during a period from start of operation of the waveform equalizer until a predetermined condition is satisfied.

2. The waveform equalizer according to claim 1, wherein the predetermined condition is that elapsed time since start of operation of the waveform equalizer exceeds a predetermined value.

3. The waveform equalizer according to claim 2, further comprising: a counter for measuring the elapsed time; and a comparator for determining whether the elapsed time measured by the counter exceeds the predetermined value or not.

4. The waveform equalizer according to claim 3, further comprising a differentiator for obtaining a sum of absolute values of respective derivative values of the plurality of tap coefficients of the IIR filter, wherein the comparator increases the predetermined time when the sum is equal to or larger than a predetermined value, and decreases the predetermined time when the sum is smaller than the predetermined value.

5. The waveform equalizer according to claim 1, wherein the predetermined condition is that a sum of absolute values of respective derivative values of the plurality of tap coefficients of the IIR filter is smaller than a predetermined value.

\* \* \* \* \*

UNITED STATES PATENT AND TRADEMARK OFFICE
CERTIFICATE OF CORRECTION

PATENT NO. : 8,165,192 B2
APPLICATION NO. : 12/304041
DATED : April 24, 2012
INVENTOR(S) : Yousuke Kimura et al.

Page 1 of 1

It is certified that error appears in the above-identified patent and that said Letters Patent is hereby corrected as shown below:

On the title page, below the data for item "(65)" and before item "(51)",

(30) Foreign Application Priority Data

Please delete "Oct. 19, 2007  (WO) ............PCT/JP2007/070457" and add

--Nov. 22, 2006  (JP)  2006-315690--.

Signed and Sealed this
Third Day of July, 2012

David J. Kappos
*Director of the United States Patent and Trademark Office*